(12) United States Patent
David et al.

(10) Patent No.: US 12,045,400 B1
(45) Date of Patent: Jul. 23, 2024

(54) STYLUS TIP PROTECTION

(71) Applicant: Microsoft Technology Licensing, LLC, Redmond, WA (US)

(72) Inventors: Nir David, Tel Aviv (IL); Joel Ephraim Bud, Tel Aviv (IL); Oren Istrin, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/318,505

(22) Filed: May 16, 2023

(51) Int. Cl.
*G06F 3/0354* (2013.01)
(52) U.S. Cl.
CPC .................. *G06F 3/03545* (2013.01)
(58) Field of Classification Search
CPC ................................... G06F 3/03545
See application file for complete search history.

(56) References Cited

U.S. PATENT DOCUMENTS

| | | | | |
|---|---|---|---|---|
| 2009/0315734 A1* | 12/2009 | Lapstun | ................ | G06F 3/0321 345/179 |
| 2013/0257824 A1* | 10/2013 | Wang | ................ | G06F 3/03545 345/179 |
| 2015/0116289 A1* | 4/2015 | Stern | ................ | G06F 3/03545 345/179 |
| 2017/0322643 A1* | 11/2017 | Eguchi | ................ | G06F 3/04162 |
| 2018/0129316 A1* | 5/2018 | Kremin | ................ | G06F 3/0442 |
| 2018/0348898 A1* | 12/2018 | Kato | ................ | B32B 27/30 |

FOREIGN PATENT DOCUMENTS

| | | | |
|---|---|---|---|
| CN | 112034998 A | * | 12/2020 |
| CN | 112034998 A | | 12/2020 |
| CN | 217060944 U | | 7/2022 |
| TW | 201439823 A | | 10/2014 |
| WO | 2022052577 A1 | | 3/2022 |

* cited by examiner

*Primary Examiner* — Amare Mengistu
*Assistant Examiner* — Jennifer L Zubajlo
(74) *Attorney, Agent, or Firm* — Alleman Hall & Tuttle LLP (57) ABSTRACT

Examples are disclosed relating to electronic styli and methods for protecting a tip of an electronic stylus. In one example, an electronic stylus comprises an elongated body and a tip protection mechanism within the elongated body comprising a housing that is moveable relative to the elongated body. A protective cone is located at a body tip end of the body, with the stylus tip configured to protrude from the protective cone. A method for protecting the tip comprises preventing relative movement between the housing and the elongated body when a force exerted on the tip is below a protection threshold. When the force exerted on the tip reaches the protection threshold, the method includes allowing movement between the housing and the elongated body that retracts the tip into the protective cone.

20 Claims, 7 Drawing Sheets

| Wherein the resilient member is a shape-memory alloy, and resetting the tip to protrude from the protracted cone comprises heating the resilient member to cause elongation of the resilient member 228 |

| Wherein heating the resilient member comprises applying an electric current to the resilient member 232 |

| Wherein resetting the tip to protrude from the protracted cone comprises translating a reload button and a shaft extending from the reload button and contacting the housing tail end of the housing to translate the housing toward the body tip end of the elongated body 236 |

| Wherein the elongated body is a cylinder, and the retention surface is a ringed portion encircling an inner periphery of the cylinder. 240 |

| Wherein the housing is a cylinder and the braking surface comprises a boss that protrudes from an outer surface of the cylinder 244 |

STYLUS TIP PROTECTION

BACKGROUND

Handheld electronic styli can be utilized to provide user interactions to a computing device, such as through contacting a touch-screen display. Some components of electronic styli can be damaged when dropped onto a hard surface.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to electronic styli and methods for protecting a tip of an electronic stylus. In one example, an electronic stylus comprises an elongated body comprising an exterior surface configured to be held by a user, and an interior surface comprising a retention surface. A protective cone is located at a body tip end of the body, and a tip is configured to protrude from the protective cone.

A tip protection mechanism is located within the elongated body, with the tip protection mechanism comprising a housing moveable relative to the elongated body. The housing is connected to the tip and comprises a braking surface that is in contact with the retention surface of the interior surface of the elongated body when the tip is protruding from the protective cone. The braking surface in contact with the retention surface (1) prevents relative movement between the braking surface and the retention surface when a force exerted on the tip is below a protection threshold, and (2) allows relative movement between the braking surface and the retention surface when the force exerted on the tip reaches the protection threshold to thereby allow the tip to retract into the protective cone.

In another example, in an electronic stylus comprising an elongated body, a tip protection mechanism within the elongated body comprising a housing that is moveable relative to the elongated body, a protective cone at a body tip end of the body, the tip configured to protrude from the protective cone, a method for protecting the tip of the stylus comprises preventing relative movement between the housing and the elongated body when a force exerted on the tip is below a protection threshold. When the force exerted on the tip reaches the protection threshold, the method includes allowing movement between the housing and the elongated body that retracts the tip into the protective cone.

DETAILED DESCRIPTION

Handheld electronic styli can be utilized to provide user interactions to a computing device, such as through contacting a touch-screen display. Some components of electronic styli, such as the stylus tip, can be damaged when dropped onto a hard surface.

Accordingly, examples are disclosed that relate to protecting the tip of an electronic stylus. In one example and as described in more detail below, a stylus includes a tip protection mechanism within an elongated body. The tip protection mechanism includes a housing that is moveable relative to the elongated body, with the housing connected to the tip. A braking surface within the housing is in contact with a retention surface of the elongated body when the tip is protruding from a protective cone of the stylus. Advantageously, the braking surface in contact with the retention surface (1) prevents relative movement between the braking surface and the retention surface when a force exerted on the tip is below a protection threshold, and (2) allows relative movement between the braking surface and the retention surface when the force exerted on the tip reaches the protection threshold, thereby allowing the tip to retract into the protective cone.

Figure 1:
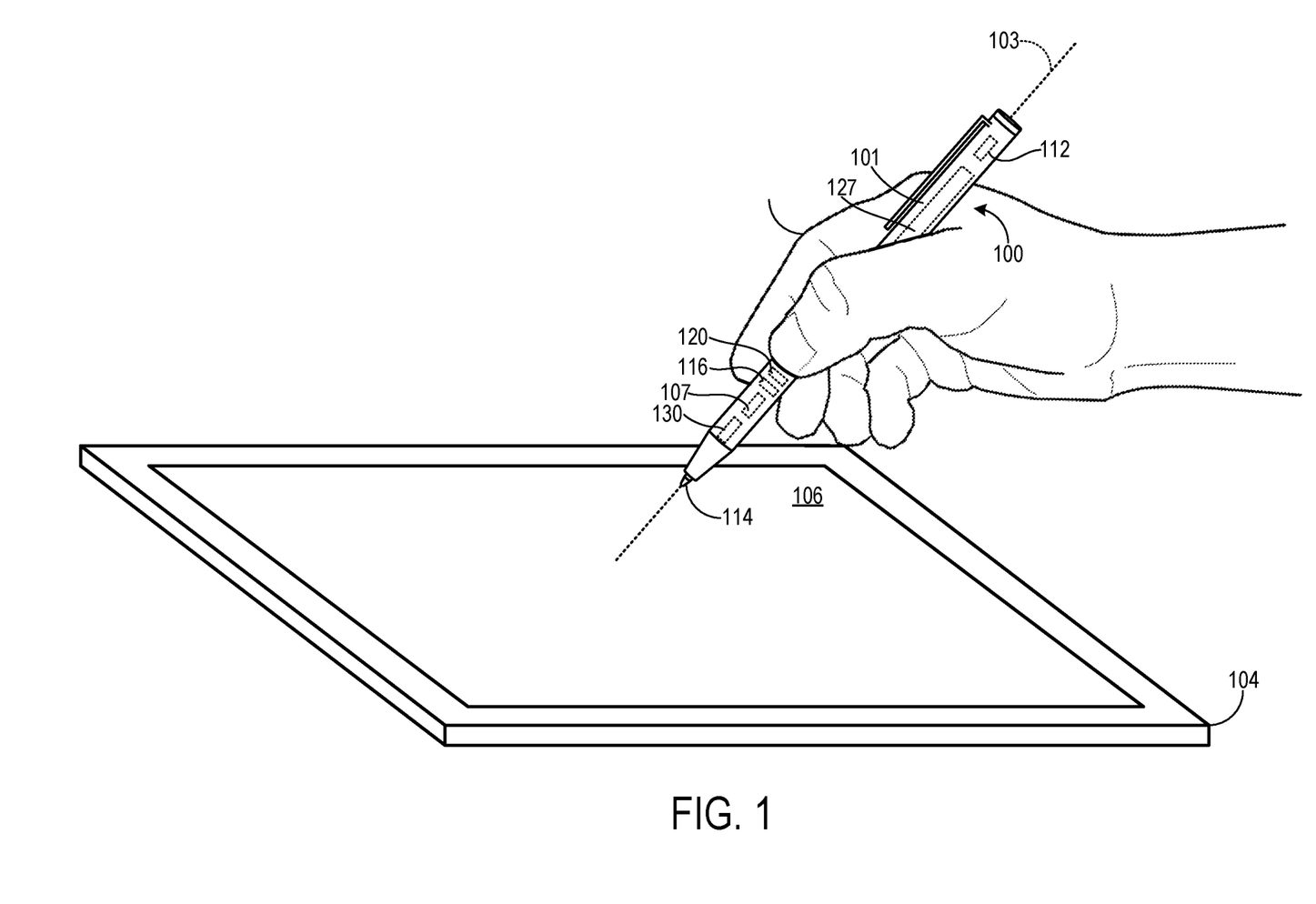
FIG. 1 shows a stylus and computing device with a touch-sensitive display screen according to examples of the present disclosure.

With reference now to FIG. 1, one example of an electronic stylus 100 according to examples of the present disclosure is depicted. Electronic stylus 100 includes an elongated body 101 that extends along a longitudinal axis 103 and takes the form factor of a pen, though the body may assume other suitable forms. As shown in the depicted example, electronic stylus 100 is operable to provide user input to a computing device 104, such as via a touch-sensitive display screen 106 of the device. Computing device 104 is shown in the form of a mobile computing device (e.g., tablet) but may assume any suitable form. Any suitable type of user input may be provided to computing device 104 using stylus 100. As examples, stylus 100 may be used to write or draw graphical content on the touch-sensitive display screen 106, modify displayed graphical content (e.g., resize, reposition, rotate), erase graphical content, select graphical user interface (GUI) elements, and/or provide gestural input.

In some examples, to enable the provision of user input from stylus 100 to computing device 104, the stylus may include a communication subsystem 107 that can transmit energy and/or data from the stylus to the computing device.

For example, the communication subsystem 107 may include a radio transmitter for wirelessly transmitting data to computing device 104 along a radio link. As another example, the communication subsystem 107 alternatively or additionally may include a capacitive transmitter for wirelessly transmitting data to computing device 104 along a capacitive link. The capacitive link may be established between the capacitive transmitter and the touch-sensitive screen 106 having a capacitive touch sensor, for example. In some examples, the stylus 100 may include one or more electrostatic antenna configured to generate electrostatic field(s).

In other examples, styli according to the present disclosure do not include a communication subsystem for transmitting energy and/or data from the stylus to a computing device. Additionally and in other examples, the principles of the present disclosure may be utilized with touch screen displays employing other touch detection technologies, including but not limited to resistive touch detection, self-capacitance touch detection, and projected capacitance touch detection.

In some examples, stylus 100 includes a sensor subsystem 112 that includes one or more sensing components and functionalities, such as strain gauge(s) and/or pressure sensor(s) at the tip 114 of the stylus 100, touch sensor(s) along body 101, accelerometer(s), gyroscope(s), magnetometer(s), inertial measurement unit(s), and force (pressure) sensor(s). Example hardware, including processor 116, memory 120 and communication subsystem 107, that may be incorporated by the stylus 100 is described further below with reference to FIG. 11. In some examples, the processor 116 includes a haptic circuit configured to control activation of a haptic feedback component 130. Stylus 100 further includes one or more power sources, such as battery 127, configured to provide power to processor 116 and to the various components of the stylus.

It will be appreciated that the electronic stylus 100 described above is merely an example, and that a wide variety of styli having different components and/or form factors can utilize the tip protection mechanisms and related principles of the present disclosure as described herein.

As noted above, components of electronic styli can be damaged when dropped onto a hard surface. In particular, the tip of an electronic stylus and adjacent sensors or other components can be damaged by contact with a surface. Accordingly, as described in more detail below and in one potential advantage of the present disclosure, styli of the present disclosure include a tip protection mechanism that comprises a housing moveable relative to the elongated body of the stylus. The housing is connected to the stylus tip and comprises a braking surface that is in contact with a retention surface of the elongated body when the tip is protruding from a protective cone. Advantageously, the braking surface in contact with the retention surface both (1) prevents relative movement between the braking surface and the retention surface when a force exerted on the tip is below a protection threshold, and (2) allows relative movement between the braking surface and the retention surface when the force exerted on the tip reaches the protection threshold, thereby allowing the tip to retract into the protective cone.

With reference now to FIGS. 2-5, one example of electronic stylus 100 is schematically illustrated. In this example the stylus 100 comprises an elongated body 101 that includes an exterior surface 136 configured to be held by a user. In the present example the elongated body 101 is a cylinder. In other examples, the elongated body may take other shapes and form factors, such as rectangular or elliptical. A protective cone 138 at a body tip end 140 of the elongated body moveably receives the tip 114 of the stylus.

In one potential advantage of the present disclosure, a tip protection mechanism 142 is located within the elongated body 101, with the tip protection mechanism comprising a housing 144 that is moveable relative to the elongated body and connected to the tip 114 at a housing tip end 146 of the housing. In this example and as described in more detail below, the housing 144 is configured to function as a rigid structure when a force exerted on the tip 114 is below a protection threshold. Advantageously, in this manner the tip 114 and stylus 100 provide a desirable user experience when a user is pressing the tip against a surface while writing, drawing, or perform other standard activities with the stylus. Additionally, and in another potential advantage, when the force exerted on the tip reaches the protection threshold, such as when the stylus is dropped tip-first onto a hard surface, the tip protection mechanism 142 allows the tip to retract into the protective cone to thereby reduce the force of impact on the tip and the possibility of damage to the tip and/or adjacent components.

Figures 2, 3, 4, 5:
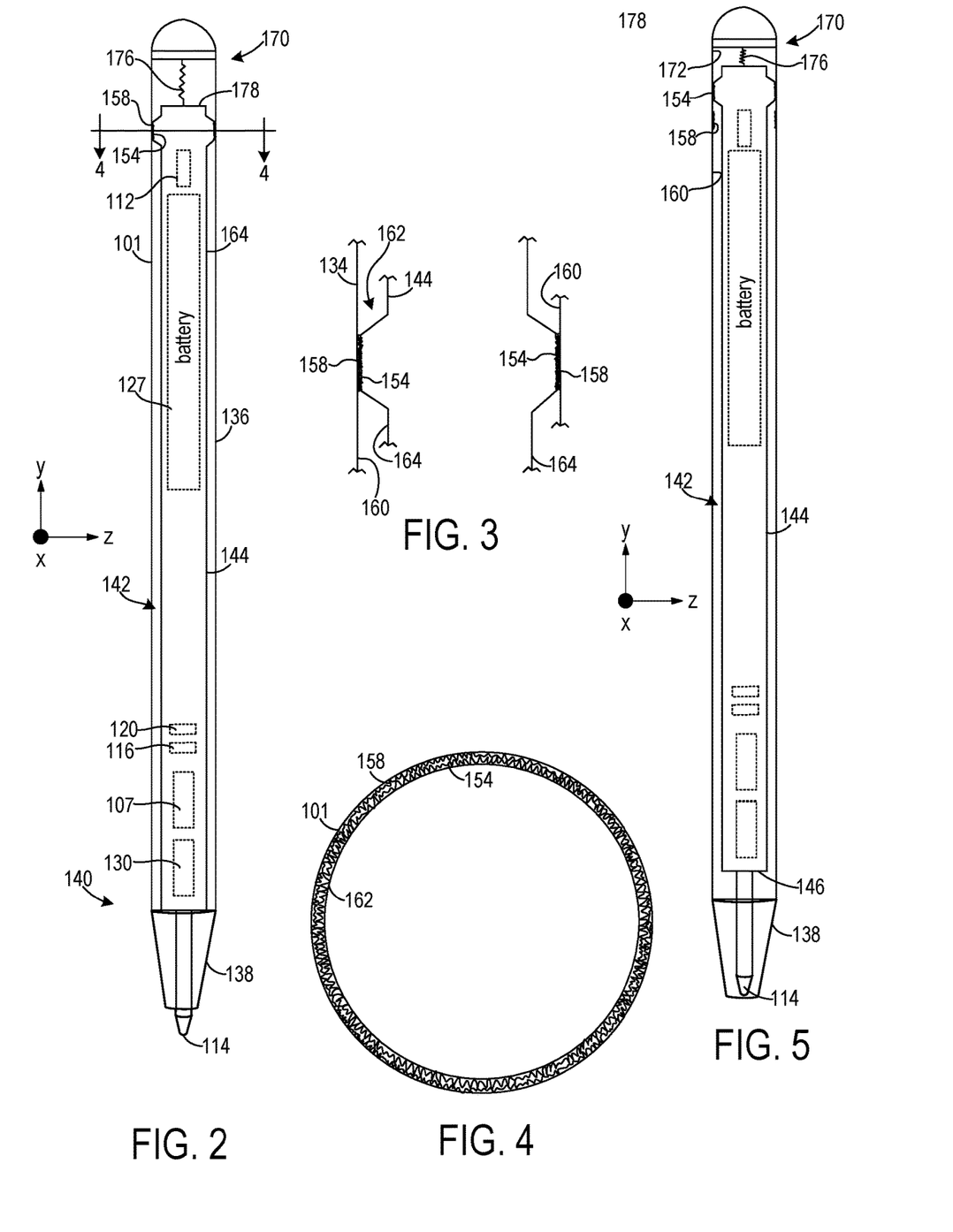
FIG. 2 shows a schematic diagram of components of the stylus of FIG. 1 according to examples of the present disclosure.
FIG. 3 shows an enlarged schematic view of the retention surface of the stylus body contacting the braking surface of the housing examples of the present disclosure.
FIG. 4 shows schematic cross section view taken along cut lines 4-4 in FIG. 2 illustrating the retention surface of the stylus body contacting the braking surface of the housing.
FIG. 5 shows the stylus of FIG. 2 with the tip retracted into the protective cone.

With reference now to FIGS. 2-4, in this example the housing 144 of the tip protection mechanism 142 comprises a braking surface 154 that is in contact with a retention surface 158 on the interior surface 160 of the elongated body 101 when the tip 114 is protruding from the protective cone 138. In this example, the elongated body 101 is a cylinder and the retention surface 158 is a ringed portion encircling a portion of an inner periphery of the cylinder. In a similar manner, in this example the housing 144 is also a cylinder and the braking surface 154 comprises a boss 162 that protrudes from an outer surface 164 of the cylinder, with the braking surface located at a distal flat surface of the boss. In this example, the boss 162 and braking surface 154 encircle a periphery of the housing. In one potential advantage of this configuration and as described further below, the ringed retention surface 158 encircling a portion of an inner periphery of the cylinder cooperates with the boss 162 of the braking surface 154 to provide 360 degrees of contact between these surfaces that correspondingly provides consistent resistance to movement between the braking surface and the retention surface when a force exerted on the tip is below a protection threshold.

In some examples the braking surface 154 is the same material as the outer surface 164 of the housing 144. In some examples the braking surface 154 has a surface roughness that is less smooth than the other portions of the outer surface 164 of the housing 144. In other examples, the braking surface comprises a band of material that is wrapped around the distal flat surface of the boss 162.

In a similar manner, in some examples the retention surface 158 on the interior surface 160 of the elongated body 101 is the same material as the other portions of the interior surface of the body. In some examples the retention surface 158 has a surface roughness that is less smooth than the other portions of the interior surface 160 of the elongated body 101. In other examples, the retention surface 158 comprises a band of material affixed to the interior surface 160 of the body 101.

In one potential advantage of the present disclosure, the braking surface 154 in contact with the retention surface 158 exhibits a coefficient of static friction that prevents relative movement between the braking surface and the retention surface when a force exerted on the tip is below a protection threshold. In one example the protection threshold can be approximately 0.5 Newtons, which corresponds to a magnitude of force expected to exceed the typical forces exerted on the tip 114 by a user during normal use of the electronic stylus 100, such as during writing, drawing, and other user contact of the stylus tip with the surface of a computing device, while also being less than forces encountered by the tip when contacting a hard surface after being dropped from a height, such as 1.0 meter. In other examples, other protection threshold force values may be utilized.

For example, during such normal uses of the electronic stylus 100, the user can press the tip 114 of the stylus against a surface to generate a force in the positive y-axis direction on the tip that is less than the protection threshold force. Advantageously, the contact between the braking surface 154 in contact with the retention surface 158 generates a friction force between the two surfaces that opposes and prevents relative movement between the surfaces and correspondingly between the housing 144 and the elongated body 101.

As noted above and in another potential advantage of the present disclosure, the coefficient of static friction between the braking surface 154 and the retention surface 158 also allows relative movement between the braking surface and the retention surface when the force exerted on the tip 114 reaches the protection threshold, thereby protecting the tip by allowing the tip to retract into the protective cone and transfer a portion of the impact force to other portions of the tip protection mechanism 142. In one example, where the protection threshold is approximately 0.5 Newtons, a user inadvertently drops the electronic stylus 100 in a manner that causes the tip 114 to impact a hardwood floor, and a corresponding impact force of 0.5 N. to be exerted on the tip in the y-axis direction. Because the impact force reaches the protection threshold force, the force of static friction is overcome and the housing 144 moves in the y-axis direction toward a body tail end 170 of the elongated body 101.

In the present example and with reference now to FIG. 5, the interior surface 160 of the elongated body 101 comprises a releasing surface 172 between the retention surface 158 and the body tail end 170 of the body. In this example, the releasing surface 158 has a releasing coefficient of kinetic friction that is less than a retention coefficient of kinetic friction of the retention surface 158. Accordingly, and in one potential advantage of this example, when the braking surface 154 of the housing 144 begins sliding against the releasing surface 172, the resistance to movement of the braking surface 154 and housing 144 is reduced and additional portions of the impact force on tip 114 are transferred from through the housing 144 as it translates in the y-axis direction. Further, such reduced resistance to movement enables the tip 114 to move more quickly into the protective cone 138

In some examples, the tip protection mechanism 142 further comprises one or more resilient members that resist movement of the housing 144 toward the body tail end 170 of the elongated body 101. As schematically illustrated in FIGS. 2 and 5, in this example the tip protection mechanism 142 comprises a resilient member in the form of spring 176 that extends between the housing tail end 178 and the body tail end 170. Accordingly, and in one potential advantage of this example, the spring 176 provides a measure of resistance to movement of the housing 144 toward the body tail end 170 of the elongated body 101 to thereby assist in decelerating and stopping movement of the housing prior to the housing contacting the body tail end. In other examples, two or more resilient members can be utilized to resist movement of the housing 144 toward the body tail end 170 of the elongated body 101.

In some examples, after the housing 144 has been translated toward the body tail end 170 and the tip 114 is correspondingly retracted into the protective cone 138 (as shown in FIG. 5), the tip can be reset into its operating position as shown in FIG. 2. In one example, a user can manually quickly accelerate and decelerate the electronic stylus 100 generally along the y-axis to urge the housing 144 to similarly translate in the negative y-axis direction relative to the elongated body 101 and cause the tip 114 to again protrude from the protective cone 138.

In other examples, the electronic stylus 100 includes additional components that function to reset the tip 114 into its operating position. In some examples the resilient member is fabricated from a shape-memory alloy that can be controlled to selectively translate the housing 144 and tip 114 back into the operating position. In one example with reference now to FIGS. 6 and 7, the spring 176 is fabricated from a shape-memory alloy, such as a nickel-titanium alloy, and is electrically coupled to the battery 127 in the electronic stylus 100 via a wire 179. In other examples, any suitable shape-memory alloy can be utilized to fabricate the one or more resilient members. Advantageously and as described further below, utilizing a shape-memory alloy for the spring 176 enables the tip 114 to be selectively reset into its operating position.

Figure 6:
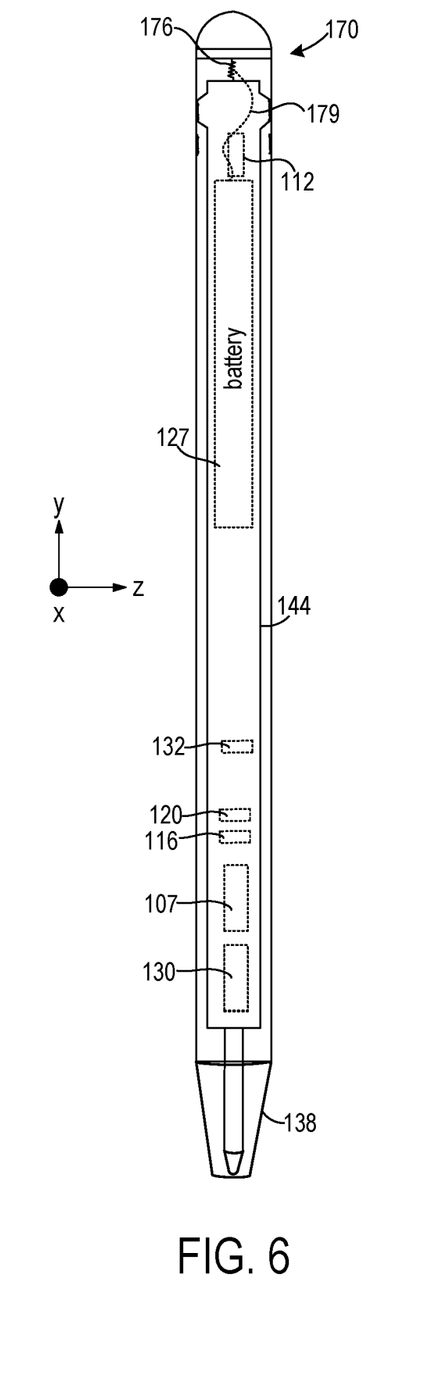
FIG. 6 shows a schematic diagram of components of a stylus according to another example of the present disclosure.
Figure 7:
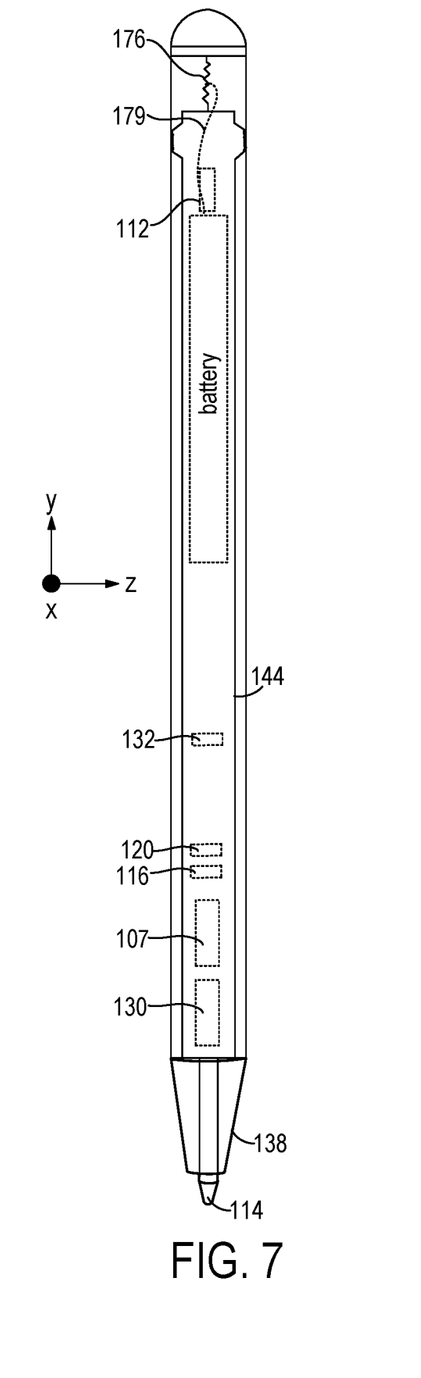
FIG. 7 shows the stylus of FIG. 6 with the tip protruding from the protective cone.

When the tip 114 has been retracted into the protective cone 138 as shown in FIG. 6, the battery 127 can be controlled to supply current to the spring 176 via wire 179 to heat the spring and cause it to expand and return to its pre-deformed shape. As shown in FIG. 7, this expansion of the spring 176 translates the housing 144 and components within the housing in the negative y-axis direction to cause the tip 114 to again protrude from the protective cone 138. In one example, the electronic stylus 100 can include a button 132 that when actuated causes the battery 127 to supply current to the spring 176.

Figure 8:
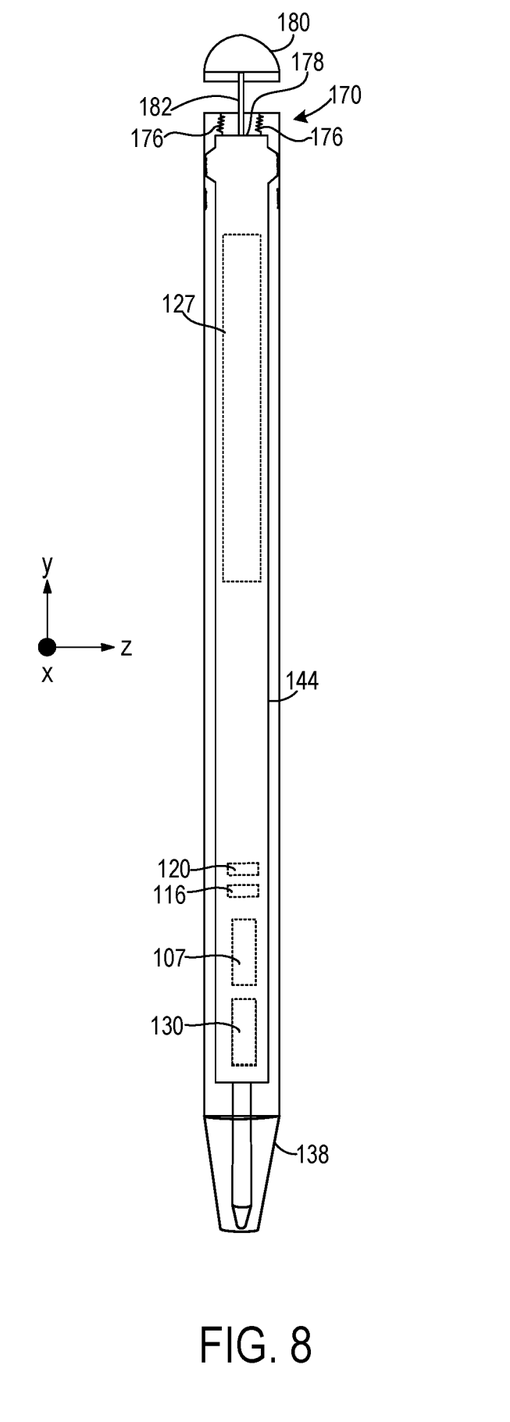
FIG. 8 shows a schematic diagram of components of a stylus according to another example of the present disclosure.
Figure 9:
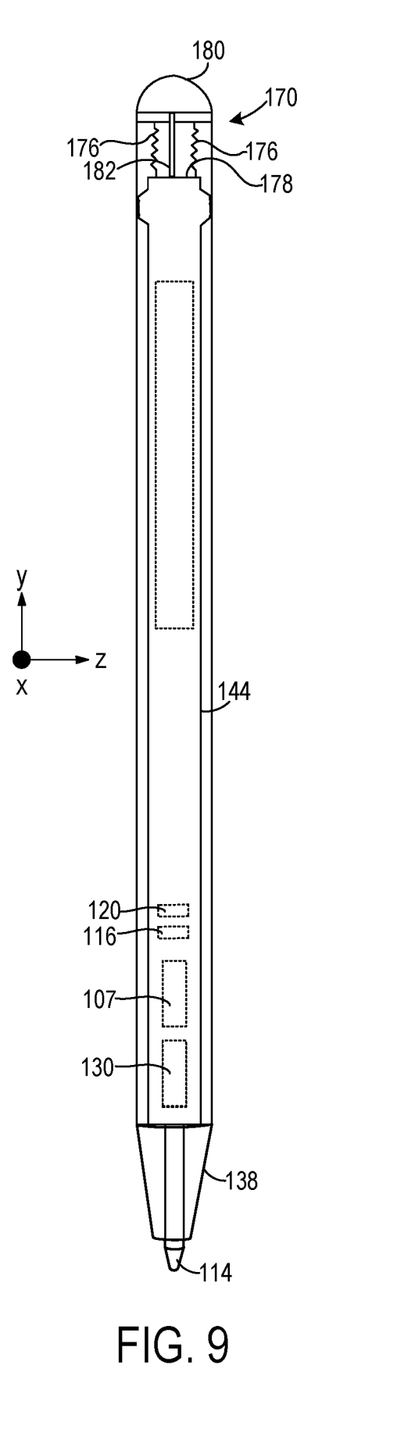
FIG. 9 shows the stylus of FIG. 8 with the tip protruding from the protective cone.

In some examples the electronic stylus 100 includes a manual reset mechanism that a user can actuate to reset the tip 114 into its operating position. With reference now to FIGS. 8 and 9, in one example the electronic stylus 100 includes a reload button 180 at the body tail end 170 of the elongated body 101. A shaft 182 extends between the reload button 180 and the housing tail end 178 of the housing 144. In this example, the tip protection mechanism includes two springs 176 extending between the housing tail end 178 and the body tail end 170.

In this example, when the tip 114 has been retracted into the protective cone 138 as shown in FIG. 8, the button 180 is extended in the y-axis direction beyond the body tail end 170 of the elongated body. To reset the tip 114 into its operating position, a user can press the button 180 in the negative y-axis direction to translate the housing 144 and tip in the negative y-axis direction until the tip protrudes from the protective cone 138. Advantageously, by locating the button 180 at the body tail end 170 of the elongated body 101, a user can conveniently actuate the button with the user's thumb while gripping the elongated body with the user's fingers.

Figure 10A:
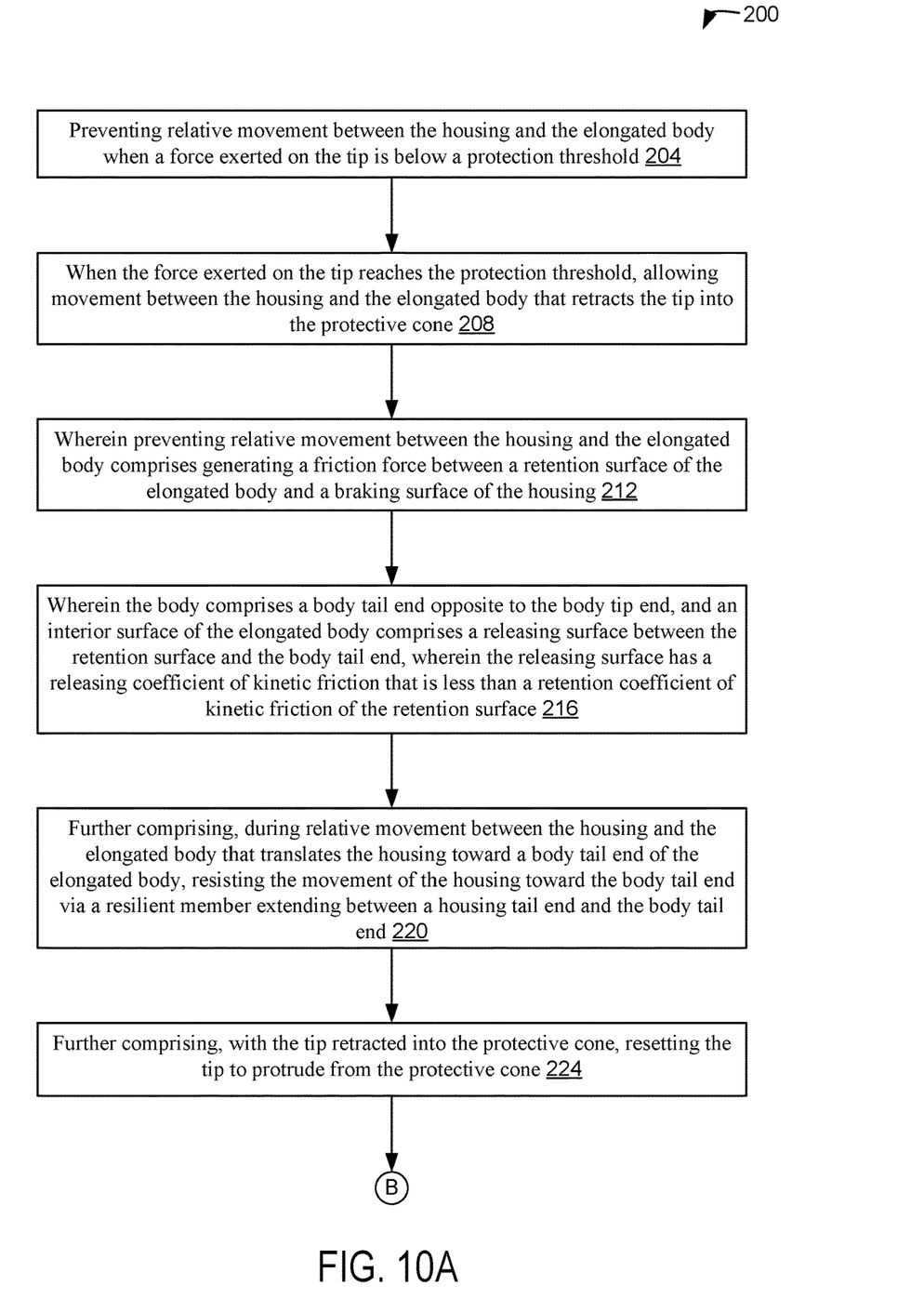
FIGS. 10A-10B show a flowchart illustrating a method for protecting a tip of an electronic stylus according to examples of the present disclosure.
Figure 10B:
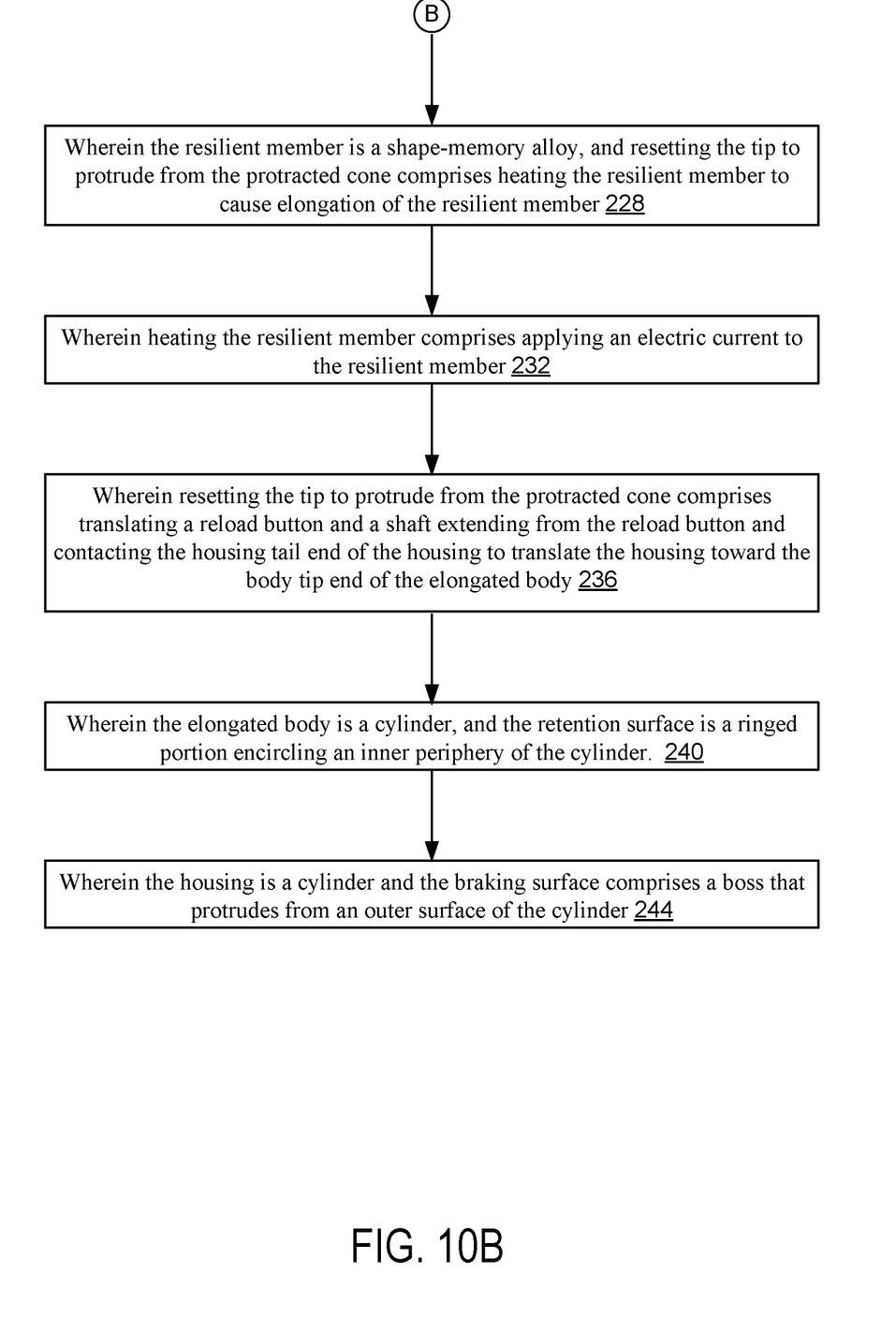

With reference now to FIGS. 10A and 10B, a method 200 for protecting a tip of an electronic stylus will now be described. FIGS. 10A-10B depict a flowchart illustrating the method 200. In some examples, method 200 may be implemented and performed at electronic stylus 100 as described above. In other examples, method 200 may be implemented and performed using other electronic styli.

The following description of method 200 is provided by way of example and is not meant to be limiting. Therefore, it is to be understood that method 200 may include additional and/or alternative steps relative to those illustrated in FIGS. 10A-10B. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

With reference to FIG. 10A, in one example the method 200 is performed with an electronic stylus comprising an elongated body, a tip protection mechanism within the elongated body comprising a housing that is moveable relative to the elongated body, and a protective cone at a body tip end of the body, with the tip configured to protrude from the protective cone. At 204 the method 200 includes preventing relative movement between the housing and the elongated body when a force exerted on the tip is below a protection threshold. At 208 the method 200 includes, when the force exerted on the tip reaches the protection threshold, allowing movement between the housing and the elongated body that retracts the tip into the protective cone.

At 212 the method 200 includes, wherein preventing relative movement between the housing and the elongated body comprises generating a friction force between a retention surface of the elongated body and a braking surface of the housing. At 216 the method 200 includes, wherein the body comprises a body tail end opposite to the body tip end, and an interior surface of the elongated body comprises a releasing surface between the retention surface and the body tail end, wherein the releasing surface has a releasing coefficient of kinetic friction that is less than a retention coefficient of kinetic friction of the retention surface. At 220 the method 200 further comprises, during relative movement between the housing and the elongated body that translates the housing toward a body tail end of the elongated body, resisting the movement of the housing toward the body tail end via a resilient member extending between a housing tail end and the body tail end.

At 224 the method 200 further comprises, with the tip retracted into the protective cone, resetting the tip to protrude from the protective cone. With reference now to FIG. 10B, at 228 the method 200 includes, wherein the resilient member is a shape-memory alloy, and resetting the tip to protrude from the protective cone comprises heating the resilient member to cause elongation of the resilient member. At 232 the method 200 includes, wherein heating the resilient member comprises applying an electric current to the resilient member. At 236 the method 200 includes, wherein resetting the tip to protrude from the protective cone comprises translating a reload button and a shaft extending from the reload button and contacting the housing tail end of the housing to translate the housing toward the body tip end of the elongated body.

At 240 the method 200 includes, wherein the elongated body is a cylinder, and the retention surface is a ringed portion encircling an inner periphery of the cylinder. At 244 the method 200 includes, wherein the housing is a cylinder and the braking surface comprises a boss that protrudes from an outer surface of the cylinder.

In some embodiments, one or more aspects of the methods and processes described herein may be tied to a computing system of one or more computing devices. In particular, such methods and processes may be implemented as a computer-application program or service, an application-programming interface (API), a library, and/or other computer-program product.

Figure 11:
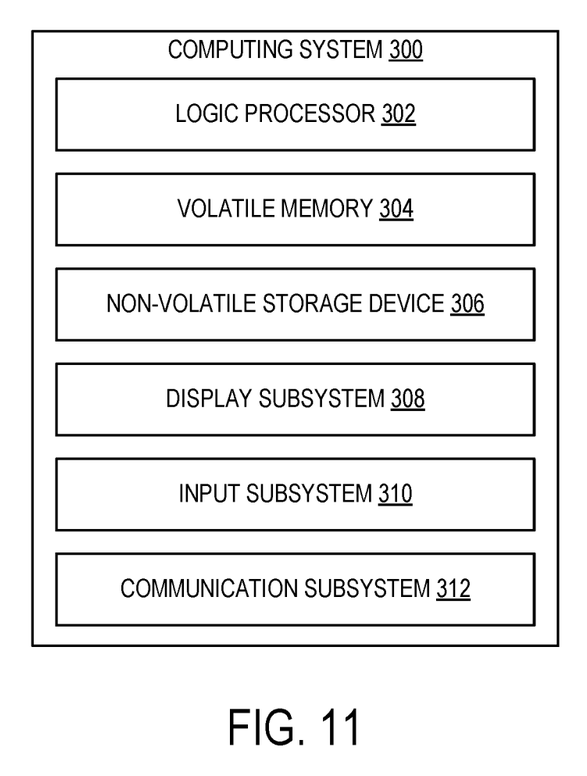
FIG. 11 schematically depicts an example computing system.

FIG. 11 schematically shows a non-limiting embodiment of a computing system 300 that can enact one or more of the methods and processes described above. Computing system 300 is shown in simplified form. The electronic stylus 100 described herein may utilize the computing system 300 or one or more aspects of the computing system.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 11.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless personal-, local-, or wide-area network, such as Bluetooth or an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides an electronic stylus, comprising: an elongated body comprising: an exterior surface configured to be held by a user; and an interior surface comprising a retention surface; a protective cone at a body tip end of the body; a tip configured to protrude from the protective cone; and a tip protection mechanism within the elongated body, the tip protection mechanism comprising a housing moveable relative to the elongated body, the housing connected to the tip and comprising a braking surface that is in contact with the retention surface of the interior surface of the elongated body when the tip is protruding from the protective cone, wherein the braking surface in contact with the retention surface (1) prevents relative movement between the braking surface and the retention surface when a force exerted on the tip is below a protection threshold, and (2) allows relative movement between the braking surface and the retention surface when the force exerted on the tip reaches the protection threshold to thereby allow the tip to retract into the protective cone. The kickstand assembly may additionally or alternatively include, wherein the body comprises a body tail end opposite to the body tip end, and the interior surface of the elongated body comprises a releasing surface between the retention surface and the body tail end, wherein the releasing surface has a releasing coefficient of kinetic friction that is less than a retention coefficient of kinetic friction of the retention surface. The kickstand assembly may additionally or alternatively include, wherein the elongated body is a cylinder, and the retention surface is a ringed portion encircling an inner periphery of the cylinder. The kickstand assembly may additionally or alternatively include, wherein the housing is a cylinder and the braking surface comprises a boss that protrudes from an outer surface of the cylinder. The kickstand assembly may additionally or alternatively include, wherein the boss encircles a periphery of the housing. The kickstand assembly may additionally or alternatively include, wherein the elongated body comprises a body tail end opposite to the body tip end, the housing comprises a housing tail end and an opposing housing tip end, the tip protection mechanism further comprising a resilient member extending between the housing tail end and the body tail end that resists movement of the housing toward the body tail end. The kickstand assembly may additionally or alternatively include, wherein the resilient member is a shape-memory alloy that is electrically coupled to a power source in the electronic stylus. The kickstand assembly may additionally or alternatively include, wherein the body comprises a body tail end opposite to the body tip end, the tip protection mechanism further comprising a reload button at the body tail end and a shaft extending between the reload button and the housing tail end of the housing. The kickstand assembly may additionally or alternatively include, wherein the housing contains at least a power source, a processor, and memory of the electronic stylus.

Another aspect provides a method for protecting a tip of an electronic stylus, the electronic stylus comprising an elongated body, a tip protection mechanism within the elongated body comprising a housing that is moveable relative to the elongated body, and a protective cone at a body tip end of the body, the tip configured to protrude from the protective cone, the method comprising: preventing relative movement between the housing and the elongated body when a force exerted on the tip is below a protection threshold, and when the force exerted on the tip reaches the protection threshold, allowing movement between the housing and the elongated body that retracts the tip into the protective cone. The method may additionally or alternatively include, wherein preventing relative movement between the housing and the elongated body comprises generating a friction force between a retention surface of the elongated body and a braking surface of the housing. The method may additionally or alternatively include, wherein the body comprises a body tail end opposite to the body tip end, and an interior surface of the elongated body comprises a releasing surface between the retention surface and the body tail end, wherein the releasing surface has a releasing coefficient of kinetic friction that is less than a retention coefficient of kinetic friction of the retention surface. The method may additionally or alternatively include, during relative movement between the housing and the elongated body that translates the housing toward a body tail end of the elongated body, resisting the movement of the housing toward the body tail end via a resilient member extending between a housing tail end and the body tail end. The method may additionally or alternatively include, with the tip retracted into the protective cone, resetting the tip to protrude from the protective cone. The method may additionally or alternatively include, wherein the resilient member is a shape-memory alloy, and resetting the tip to protrude from the protective cone comprises heating the resilient member to cause elongation of the resilient member. The method may additionally or alternatively include, wherein heating the resilient member comprises applying an electric current to the resilient member. The method may additionally or alternatively include, wherein resetting the tip to protrude from the protective cone comprises translating a reload button and a shaft extending from the reload button and contacting the housing tail end of the housing to translate the housing toward the body tip end of the elongated body. The method may additionally or alternatively include, wherein the elongated body is a cylinder, and the retention surface is a ringed portion encircling a portion of an inner periphery of the cylinder. The method may additionally or alternatively include, wherein the housing is a cylinder and the braking surface comprises a boss that protrudes from an outer surface of the cylinder.

Another aspect provides an electronic stylus, comprising: a cylindrical elongated body comprising: an exterior surface configured to be held by a user; and an interior surface comprising a retention surface forming a ringed portion encircling an inner periphery of the cylinder; a protective cone at a body tip end of the body; a tip configured to protrude from the protective cone; a body tail end opposite to the body tip end of the elongated body; and a tip protection mechanism within the elongated body, the tip protection mechanism comprising a housing moveable relative to the elongated body, the housing connected to the tip and comprising a braking surface that is in contact with the retention surface of the interior surface of the elongated body when the tip is protruding from the protective cone, wherein the braking surface in contact with the retention surface (1) prevents relative movement between the braking surface and the retention surface when a force exerted on the tip is below a protection threshold, and (2) allows relative movement between the braking surface and the retention surface when the force exerted on the tip reaches the protection threshold to thereby allow the tip to retract into the protective cone, wherein the interior surface of the elongated body comprises a releasing surface between the retention surface and the body tail end, wherein the releasing surface has a releasing coefficient of kinetic friction that is less than a retention coefficient of kinetic friction of the retention surface.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic stylus, comprising:
    an elongated body comprising:
        an exterior surface configured to be held by a user; and
        an interior surface comprising a retention surface;
    a protective cone at a body tip end of the body;
    a tip configured to protrude from the protective cone; and
    a tip protection mechanism within the elongated body, the tip protection mechanism comprising a housing moveable relative to the elongated body, the housing connected to the tip and comprising a braking surface that is in slidable contact with the interior surface of the elongated body, the braking surface in contact with the retention surface of the interior surface of the elongated body when the tip is protruding from the protective cone,
    wherein the braking surface in contact with the retention surface (1) prevents relative movement between the braking surface and the retention surface without utilizing a processor when a force exerted on the tip is below a protection threshold, and (2) allows relative movement between the braking surface and the retention surface without utilizing a processor when the force exerted on the tip reaches the protection threshold to thereby allow the tip to retract into the protective cone.

2. The electronic stylus of claim 1, wherein the body comprises a body tail end opposite to the body tip end, and the interior surface of the elongated body comprises a releasing surface between the retention surface and the body tail end, wherein the releasing surface has a releasing coefficient of kinetic friction that is less than a retention coefficient of kinetic friction of the retention surface.

3. The electronic stylus of claim 1, wherein the elongated body is a cylinder, and the retention surface is a ringed portion encircling an inner periphery of the cylinder.

4. The electronic stylus of claim 3, wherein the housing is a cylinder and the braking surface comprises a boss that protrudes from an outer surface of the cylinder.

5. The electronic stylus of claim 4, wherein the boss encircles a periphery of the housing.

6. The electronic stylus of claim 1, wherein the elongated body comprises a body tail end opposite to the body tip end, the housing comprises a housing tail end and an opposing housing tip end, the tip protection mechanism further comprising a resilient member extending between the housing tail end and the body tail end that resists movement of the housing toward the body tail end.

7. The electronic stylus of claim 6, wherein the resilient member is a shape-memory alloy that is electrically coupled to a power source in the electronic stylus.

8. The electronic stylus of claim 1, wherein the body comprises a body tail end opposite to the body tip end, the tip protection mechanism further comprising a reload button at the body tail end and a shaft extending between the reload button and the housing tail end of the housing.

9. The electronic stylus of claim 1, wherein the housing contains at least a power source, a processor, and memory of the electronic stylus.

10. A method for protecting a tip of an electronic stylus, the electronic stylus comprising an elongated body, a tip protection mechanism within the elongated body comprising a housing that is moveable relative to the elongated body, the housing connected to the tip and comprising a braking surface that is in slidable contact with an interior surface of the elongated body, the interior surface comprising a retention surface, and a protective cone at a body tip end of the body, the tip configured to protrude from the protective cone, the method comprising:
without utilizing a processor, utilizing friction between the braking surface and the retention surface to prevent relative movement between the housing and the elongated body when a force exerted on the tip is below a protection threshold, and
without utilizing a processor, when the force exerted on the tip reaches the protection threshold, allowing movement between the housing and the elongated body that retracts the tip into the protective cone.

11. The method of claim 10, wherein the body comprises a body tail end opposite to the body tip end, and the interior surface of the elongated body comprises a releasing surface between the retention surface and the body tail end, wherein the releasing surface has a releasing coefficient of kinetic friction that is less than a retention coefficient of kinetic friction of the retention surface.

12. The method of claim 11, wherein the elongated body is a cylinder, and the retention surface is a ringed portion encircling a portion of an inner periphery of the cylinder.

13. The method of claim 12, wherein the housing is a cylinder and the braking surface comprises a boss that protrudes from an outer surface of the cylinder.

14. The method of claim 10, further comprising, during relative movement between the housing and the elongated body that translates the housing toward a body tail end of the elongated body, resisting the movement of the housing toward the body tail end via a resilient member extending between a housing tail end and the body tail end.

15. The method of claim 10, further comprising, with the tip retracted into the protective cone, resetting the tip to protrude from the protective cone.

16. The method of claim 15, wherein the resilient member is a shape-memory alloy, and resetting the tip to protrude from the protective cone comprises heating the resilient member to cause elongation of the resilient member.

17. The method of claim 16, wherein heating the resilient member comprises applying an electric current to the resilient member.

18. The method of claim 15, wherein resetting the tip to protrude from the protective cone comprises translating a reload button and a shaft extending from the reload button and contacting the housing tail end of the housing to translate the housing toward the body tip end of the elongated body.

19. The method of claim 10, wherein the housing contains at least a power source, a processor, and memory of the electronic stylus.

20. An electronic stylus, comprising:
a cylindrical elongated body comprising:
an exterior surface configured to be held by a user; and
an interior surface comprising a retention surface forming a ringed portion encircling an inner periphery of the cylinder;
a protective cone at a body tip end of the body;
a tip configured to protrude from the protective cone;
a body tail end opposite to the body tip end of the elongated body; and
a tip protection mechanism within the elongated body, the tip protection mechanism comprising a housing moveable relative to the elongated body, the housing connected to the tip and comprising a braking surface that is in contact with the retention surface of the interior surface of the elongated body when the tip is protruding from the protective cone,
wherein the braking surface in contact with the retention surface (1) prevents relative movement between the braking surface and the retention surface when a force exerted on the tip is below a protection threshold, and (2) allows relative movement between the braking surface and the retention surface when the force exerted on the tip reaches the protection threshold to thereby allow the tip to retract into the protective cone,
wherein the interior surface of the elongated body comprises a releasing surface between the retention surface and the body tail end, wherein the releasing surface has a releasing coefficient of kinetic friction that is less than a retention coefficient of kinetic friction of the retention surface.

* * * * *